(12) United States Patent
Matsumura

(10) Patent No.: US 11,056,882 B2
(45) Date of Patent: Jul. 6, 2021

(54) POWER MANAGEMENT DEVICE, POWER MANAGEMENT SYSTEM, POWER MANAGEMENT METHOD, AND CONTROL PROGRAM

(71) Applicant: SUMITOMO ELECTRIC INDUSTRIES, LTD., Osaka (JP)

(72) Inventor: Takafumi Matsumura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 11 days.

(21) Appl. No.: 16/636,739

(22) PCT Filed: Apr. 16, 2018

(86) PCT No.: PCT/JP2018/015655
§ 371 (c)(1),
(2) Date: Feb. 5, 2020

(87) PCT Pub. No.: WO2019/030986
PCT Pub. Date: Feb. 14, 2019

(65) Prior Publication Data
US 2020/0371485 A1 Nov. 26, 2020

(30) Foreign Application Priority Data
Aug. 9, 2017 (JP) .............................. JP2017-154376

(51) Int. Cl.
*H02J 3/14* (2006.01)
*G05B 19/042* (2006.01)
(Continued)

(52) U.S. Cl.
CPC .............. *H02J 3/144* (2020.01); *G05B 15/02* (2013.01); *G05B 19/042* (2013.01); *G05F 1/66* (2013.01);
(Continued)

(58) Field of Classification Search
CPC ... G06F 1/26; G06F 1/266; G06F 1/28; G06F 1/3203; G06F 1/3206; G06F 1/3209;
(Continued)

(56) References Cited

U.S. PATENT DOCUMENTS 7,188,260 B1* 3/2007 Shaffer ................... G06F 1/189
713/300
8,886,477 B2* 11/2014 Imahara .................. H02J 3/004
702/61
(Continued)

FOREIGN PATENT DOCUMENTS

| EP | 2924838 A1 | 9/2015 |
|---|---|---|
| JP | H10-150491 A | 6/1998 |

(Continued)

OTHER PUBLICATIONS

Jun. 12, 2018 International Search Report issued in International Patent Application No. PCT/JP2018/015655.

*Primary Examiner* — Crystal J Barnes-Bullock
(74) *Attorney, Agent, or Firm* — Oliff PLC

(57) ABSTRACT

A power management device has power consumption information in a building of a power customer, and stores history information in which the acquired power consumption information and time information indicating a time frame in which power has been consumed in the building are associated with each other. When having received a request based on power supply and demand, the power management device determines ease or difficulty in management of power consumption according to the request, on the basis of the stored history information, and power-management-required time frame information indicating a time frame for which power management according to the request is required, and notifies the power customer of a determination result. Then the power management device receives accep- (Continued)

tance or rejection of the request, and transmits response information corresponding to a received content, to a request source.

20 Claims, 10 Drawing Sheets

(51) Int. Cl.

| | |
|---|---|
| *H04W 52/02* | (2009.01) |
| *G06Q 50/06* | (2012.01) |
| *G05F 1/66* | (2006.01) |
| *G05B 15/02* | (2006.01) |
| *H02J 3/00* | (2006.01) |
| *G06F 1/28* | (2006.01) |
| *G06F 1/3234* | (2019.01) |
| *G06F 1/26* | (2006.01) |
| *G06F 1/3206* | (2019.01) |
| *G06F 1/3287* | (2019.01) |
| *G06F 1/3203* | (2019.01) |
| *G06F 1/3209* | (2019.01) |

(52) U.S. Cl.
CPC ............. *G06F 1/26* (2013.01); *G06F 1/266* (2013.01); *G06F 1/28* (2013.01); *G06F 1/3203* (2013.01); *G06F 1/3206* (2013.01); *G06F 1/3209* (2013.01); *G06F 1/3234* (2013.01); *G06F 1/3287* (2013.01); *G06Q 50/06* (2013.01); *H02J 3/003* (2020.01); *H04W 52/0258* (2013.01); *G05B 2219/2639* (2013.01); *H02J 2310/14* (2020.01); *H02J 2310/64* (2020.01)

(58) Field of Classification Search
CPC ........ G06F 1/3234; G06F 1/3287; G05F 1/66; G05B 15/02; G05B 19/042; G05B 2219/2639; G06Q 50/06; H02J 3/003; H02J 3/14; H02J 3/144; H02J 3/32; H02J 13/0006; H02J 2310/14; H02J 2310/64; H04W 52/0258

See application file for complete search history.

(56) References Cited

U.S. PATENT DOCUMENTS

| | | | |
|---|---|---|---|
| 9,657,979 B2* | 5/2017 | Yoshimi | G05B 15/02 |
| 10,222,119 B2* | 3/2019 | Rezayat | F25D 29/00 |
| 10,243,364 B2* | 3/2019 | Nakaishi | H02J 13/0079 |
| 10,298,056 B2* | 5/2019 | Kudo | H02J 3/32 |
| 10,530,154 B2* | 1/2020 | Maeda | H02J 13/0006 |
| 10,630,077 B2* | 4/2020 | Utamaru | G05B 15/02 |
| 2003/0023540 A2* | 1/2003 | Johnson | G06Q 50/06 |
| | | | 705/37 |
| 2012/0245868 A1 | 9/2012 | Imahara et al. | |
| 2014/0371942 A1* | 12/2014 | Matsuyama | H02J 3/14 |
| | | | 700/297 |
| 2016/0266181 A1* | 9/2016 | Kawaguchi | G01R 21/133 |
| 2017/0242466 A1* | 8/2017 | Gelonese | G06Q 50/06 |
| 2017/0302077 A1 | 10/2017 | Yabe et al. | |
| 2017/0330294 A1* | 11/2017 | Murakami | G06F 1/266 |

FOREIGN PATENT DOCUMENTS

| | | | | |
|---|---|---|---|---|
| JP | 2006-293621 A | | 10/2006 | |
| JP | 2012-205385 A | | 10/2012 | |
| JP | 2014-103811 A | | 6/2014 | |
| JP | 2014229000 A | * | 12/2014 | |
| JP | 2015-057001 A | | 3/2015 | |
| JP | 2015-216760 A | | 12/2015 | |
| JP | 2016-136795 A | | 7/2016 | |
| JP | 2016-163384 A | | 9/2016 | |
| JP | 2016158369 A | * | 9/2016 | |
| WO | 2016/071956 A1 | | 5/2016 | |
| WO | WO-2016185665 A1 | * | 11/2016 | ............. H02J 13/00 |
| WO | 2017/109957 A1 | | 6/2017 | |
| WO | WQ-2019030986 A1 | * | 2/2019 | ................ H02J 3/00 |

* cited by examiner

FIG. 4

| APPARATUS IDENTIFIER | NAME | OPERATION MANNER, etc. | APPARATUS POWER CONSUMPTION |
|---|---|---|---|
| 0002 | AIR CONDITIONER | NORMAL | 2.0[kW] |
| 0002 | AIR CONDITIONER | POWER SAVING | 1.5[kW] |
| 0002 | AIR CONDITIONER | SET AT 25°C | 2.2[kW] |
| 0002 | AIR CONDITIONER | SET AT 29°C | 1.5[kW] |
| ... | ... | ... | ... |
| 0001 | LIGHTING APPARATUS | NORMAL | 0.2[kW] |
| 0001 | LIGHTING APPARATUS | POWER SAVING | 0.1[kW] |
| ... | ... | ... | ... |

12c

F I G. 6

| RESPONSE SETTING | NOTIFICATION WHEN ACHIEVEMENT IS DIFFICULT: NECESSARY | NOTIFICATION WHEN ACHIEVEMENT IS DIFFICULT: UNNECESSARY |
|---|---|---|
| ALWAYS ACCEPT IN PRINCIPLE | NOTIFICATION-PERMITTED TIME FRAME (NOTIFICATION-PROHIBITED TIME FRAME) | NO ANSWER BEFORE DEADLINE: ACCEPT |
| | | NO ANSWER BEFORE DEADLINE: REJECT |
| ALWAYS SELECT ACCEPTANCE OR REJECTION | NOTIFICATION-PERMITTED TIME FRAME (NOTIFICATION-PROHIBITED TIME FRAME) | NO ANSWER BEFORE DEADLINE: ACCEPT |
| | | NO ANSWER BEFORE DEADLINE: REJECT |

FIG. 8

| YEAR, MONTH, DAY | TIME FRAME | POWER CONSUMPTION INFORMATION | WEATHER INFORMATION (AIR TEMPERATURE, HUMIDITY) | OPERATION INFORMATION (NORMAL MODE/ POWER SAVING MODE, ON/OFF) | POWER GENERATION AMOUNT INFORMATION | POWER STORAGE AMOUNT INFORMATION |

12e

POWER MANAGEMENT DEVICE, POWER MANAGEMENT SYSTEM, POWER MANAGEMENT METHOD, AND CONTROL PROGRAM

TECHNICAL FIELD

The present invention relates to a power management device, a power management system, a power management method, and a control program.

This application claims priority on Japanese Patent Application No. 2017-154376 filed on Aug. 9, 2017, the entire content of which is incorporated herein by reference.

BACKGROUND ART

Associated with advancement of power deregulation, HEMS (Home Energy Management System) and BEMS (Building Energy Management System) in which energy management is performed on the power customer side such as houses and office buildings are increasingly being used. In addition, distributed-type energy management systems in which, in accordance with the power supply and demand status, HEMS and BEMS are caused to operate in coordination so as to maintain the balance between the power supply and demand of the entirety of a power system, have been studied for realization.

As a scheme for maintaining the balance between power supply and demand, "demand response" (DR) is attracting attention. Demand response is a scheme in which, when the power supply and demand is tight, a power supplier requests a power customer to save power, and the power customer adjusts power consumption in accordance with the request so that the balance between the power supply and demand is maintained. There are various forms for agreements (DR program) regarding the demand response. For example, a power customer who has accepted a request can obtain a predetermined consideration when the power customer has achieved a reduction target of power consumption. When the power customer fails in achieving the reduction target, a penalty is imposed, and the power customer has to pay penalty money. PATENT LITERATURE 1 discloses a technology for presenting, to a power customer, monetary effects, environmental effects, etc., obtained by complying with a request for power saving.

CITATION LIST

Patent Literature

PATENT LITERATURE 1: International Publication No. 2016/071956

SUMMARY OF INVENTION

A power management device according to the present aspect is configured to manage power consumption in a building of a power customer. The power management device includes: a power-consumption-information acquisition unit configured to acquire power consumption information indicating the power consumption in the building; a storage unit having stored therein history information including at least the power consumption information acquired by the power-consumption-information acquisition unit, and time information indicating a time frame in which power according to the power consumption information has been consumed in the building, the power consumption information and the time information being associated with each other in the history information; a request reception unit configured to receive a request based on power supply and demand; a determination unit configured to, when the request reception unit has received the request, determine ease or difficulty in management of the power consumption according to the request, on the basis of the history information stored in the storage unit, and power-management-required time frame information indicating a time frame for which power management according to the request is required; a notification unit configured to notify the power customer of a determination result by the determination unit; a reception unit configured to receive acceptance or rejection of the request; and a response transmission unit configured to transmit, to a request source, response information corresponding to a content received by the reception unit.

A power management system according to the present aspect includes: the power management device; a power supply-demand management device configured to transmit the request based on power supply and demand to the power management device; and a communication terminal configured to perform communication with the power management device. The power management device notifies the power customer of the determination result via the communication terminal, receives acceptance or rejection of the request, and transmits the response information corresponding to a received content to the power supply-demand management device.

A power management method according to the present aspect is for managing power consumption in a building of a power customer. The power management method includes: acquiring power consumption information indicating the power consumption in the building; storing history information including at least the acquired power consumption information, and time information indicating a time frame in which power according to the power consumption information has been consumed in the building, the power consumption information and the time information being associated with each other in the history information; receiving a request based on power supply and demand; determining, when having received the request, ease or difficulty in management of the power consumption according to the request, on the basis of the history information, and power-management-required time frame information indicating a time frame for which power management according to the request is required; notifying the power customer of a determination result; receiving acceptance or rejection of the request; and transmitting response information corresponding to a received content, to a request source.

A control program according to the present aspect is for causing a computer configured to manage power consumption in a building of a power customer, to operate and perform the processes of: acquiring power consumption information indicating the power consumption in the building; storing history information including at least the acquired power consumption information, and time information indicating a time frame in which power according to the power consumption information has been consumed in the building, the power consumption information and the time information being associated with each other in the history information; receiving a request based on power supply and demand; determining, when having received the request, ease or difficulty in management of the power consumption according to the request, on the basis of the history information, and power-management-required time frame information indicating a time frame for which power management according to the request is required; notifying the power customer of a determination result; receiving acceptance or rejection of the request; and transmitting response information corresponding to a received content, to a request source.

BRIEF DESCRIPTION OF DRAWINGS

FIG. 4 is a conceptual diagram of a power consumption table.

FIG. 6 is a conceptual diagram of a response setting content.

FIG. 7 is a sequence diagram showing a processing procedure regarding accumulation of history information of power consumption, weather information, and the like.

FIG. 8 is a schematic diagram indicating the history information stored in a storage unit.

DESCRIPTION OF EMBODIMENTS

Figure 1:
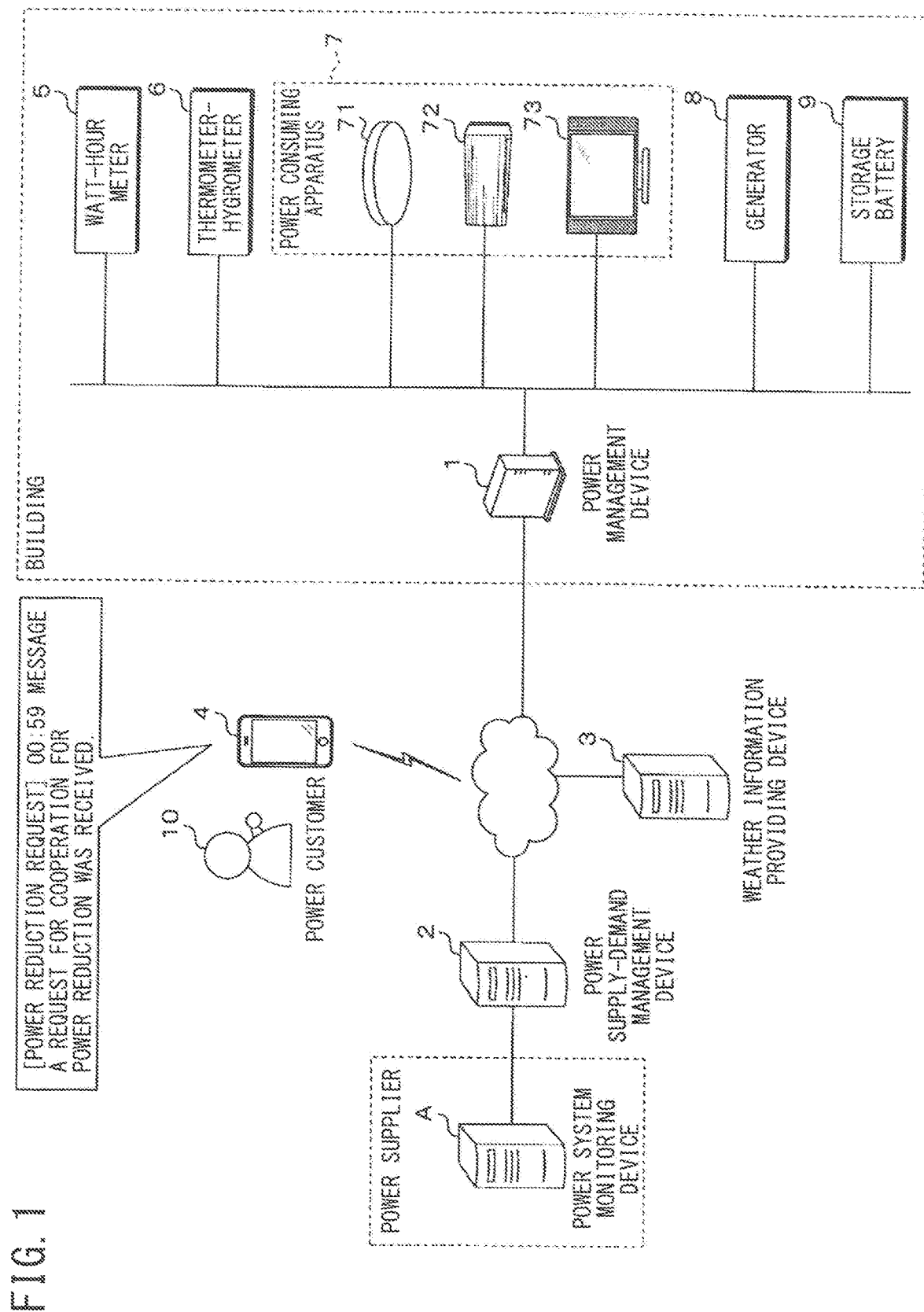
FIG. 1 is a schematic diagram showing a configuration example of a power management system according to the present embodiment.

Problem to be Solved by the Present Disclosure

The power management device mentioned above has a technological problem as follows. That is, information for determining whether or not a request regarding demand response should be accepted, in particular, information for determining the degree of difficulty in achieving the power saving target, cannot be provided to the power customer, and the balance between power supply and demand cannot be maintained in a reasonable and effective manner.

An object of the present disclosure is to provide a power management device, a power management system, a power management method, and a control program that enable providing to the power customer, as information for determining whether or not a request regarding demand response should be accepted, information regarding ease or difficulty in power management according to the request.

Effect of the Present Disclosure

According to the present disclosure, it becomes possible to provide a power management device, a power management system, a power management method, and a control program that enable providing to the power customer, as information for determining whether or not a request regarding demand response should be accepted, information regarding ease or difficulty in power management according to the request.

Description of Embodiment of the Present Disclosure

First, embodiments of the present disclosure are listed and described. At least some parts of the embodiment described below may be combined as desired.

(1) A power management device according to the present aspect is configured to manage power consumption in a building of a power customer. The power management device includes: a power-consumption-information acquisition unit configured to acquire power consumption information indicating the power consumption in the building; a storage unit having stored therein history information including at least the power consumption information acquired by the power-consumption-information acquisition unit, and time information indicating a time frame in which power according to the power consumption information has been consumed in the building, the power consumption information and the time information being associated with each other in the history information; a request reception unit configured to receive a request based on power supply and demand; a determination unit configured to, when the request reception unit has received the request, determine ease or difficulty in management of the power consumption according to the request, on the basis of the history information stored in the storage unit, and power-management-required time frame information indicating a time frame for which power management according to the request is required; a notification unit configured to notify the power customer of a determination result by the determination unit; a reception unit configured to receive acceptance or rejection of the request; and a response transmission unit configured to transmit, to a request source, response information corresponding to a content received by the reception unit.

When having received a request based on power supply and demand, the power management device determines ease or difficulty in management of the power consumption according to the request, and notifies the power customer of the determination result. The request based on power supply and demand is, for example, a power saving request that requires suppression of power consumption. The power management device determines ease or difficulty in the power saving and notifies the power customer of the determination result. Therefore, it is possible to cause the power customer to recognize the degree of difficulty in the power management according to the request.

Then, the power management device receives an instruction on whether or not to accept the request from the power customer, and transmits response information corresponding to the received content, to the request source. As described above, according to the present aspect, the power customer can comply with the request based on power supply and demand after grasping the degree of difficulty in the power management. Therefore, the power consumption can be managed in a reasonable and effective manner.

The request based on power supply and demand is not limited to a power saving request, and may be a request regarding provision of power obtained through power generation in a building.

(2) Preferably, the power management device includes: a weather information acquisition unit configured to acquire weather information indicating a weather in a vicinity of the building; and a prediction information acquisition unit configured to acquire weather prediction information indicating a predicted weather in the vicinity of the building. The history information further includes the weather information acquired by the weather information acquisition unit, and at least the power consumption information, the time information, and the weather information are associated with one another in the history information. The determination unit determines the ease or difficulty in the management of the power consumption according to the request, on the basis of the history information stored in the storage unit, the weather prediction information acquired by the prediction information acquisition unit, and the power-management-required time frame information indicating the time frame for which the power management according to the request is required.

The power management device can determine the ease or difficulty in the management of the power consumption according to the request based on power supply and demand, in consideration of the weather information such as temperature and humidity.

(3) Preferably, the weather prediction information includes information indicating the predicted weather in the vicinity of the building. The power management device includes a power generation amount prediction unit configured to predict a power generation amount of a generator configured to generate power by use of energy of sunlight, on the basis of the weather prediction information acquired by the prediction information acquisition unit. The determination unit determines the ease or difficulty in the management of the power consumption according to the request, on the basis of the history information stored in the storage unit, the weather prediction information acquired by the prediction information acquisition unit, the power-management-required time frame information indicating the time frame for which the power management according to the request is required, and a prediction result of the power generation amount prediction unit.

The power management device can determine the ease or difficulty in the management of the power consumption according to the request based on power supply and demand, in consideration of the power generation amount of the generator.

(4) Preferably, the power management device includes a power storage amount information acquisition unit configured to acquire power storage amount information indicating a power storage amount of a storage battery provided in the building. The determination unit determines the ease or difficulty in the management of the power consumption according to the request, on the basis of the history information stored in the storage unit, the power-management-required time frame information indicating the time frame for which the power management according to the request is required, and the power storage amount information acquired by the power storage amount information acquisition unit.

The power management device can determine the ease or difficulty in the management of the power consumption according to the request based on power supply and demand, in consideration of the power storage amount of the storage battery.

(5) Preferably, the storage unit has stored therein a relationship between an operation manner of a power consuming apparatus provided in the building and an apparatus power consumption indicating power consumed by the power consuming apparatus in the operation manner. The power management device further includes: a specifying unit configured to specify the operation manner of the power consuming apparatus for enabling the management of the power consumption according to the request, on the basis of the history information stored in the storage unit, and the relationship between the operation manner and the apparatus power consumption; and an operation manner notification unit configured to notify the power customer of the operation manner specified by the specifying unit.

On the basis of the relationship between the operation manner of the power consuming apparatus and the apparatus power consumption stored in the storage unit, the power management device specifies an operation manner, of the power consuming apparatus, that realizes the management of the power consumption according to the request based on power supply and demand, and notifies the power customer of the specified operation manner. Therefore, with reference to the operation manner, the power customer can more specifically consider whether or not the power management according to the request can be achieved, and can determine whether or not to accept the request. Therefore, the power consumption can be managed in a reasonable and effective manner.

(6) Preferably, the power management device includes an operation information acquisition unit configured to acquire operation information indicating an operation manner of a power consuming apparatus provided in the building. The history information further includes the operation information acquired by the operation information acquisition unit, and at least the power consumption information, the time information, and the operation information are associated with one another in the history information. The power management device further includes: a specifying unit configured to specify the operation manner of the power consuming apparatus for enabling the management of the power consumption according to the request, on the basis of the history information stored in the storage unit; and an operation manner notification unit configured to notify the power customer of the operation manner specified by the specifying unit.

On the basis of the history information, the power management device notifies the power customer of an operation manner, of the power consuming apparatus, that realizes the management of the power consumption according to the request based on power supply and demand. Therefore, with reference to the operation manner, the power customer can more specifically consider whether or not the power management according to the request can be achieved, and can determine whether or not to accept the request. Therefore, the power consumption can be managed in a reasonable and effective manner.

(7) Preferably, the power management device includes a notification-omitted response setting reception unit configured to receive a notification-omitted response setting in which, when the request reception unit has received the request, if the determination unit has made a determination of being easy, the notification of the determination result by the notification unit is omitted, and the response information indicating that, with respect to the request, the request is to be accepted is transmitted to the request source. Under operation in the notification-omitted response setting, when the determination unit has made a determination of being easy, the response transmission unit transmits the response information indicating that the request is to be accepted, and when the determination unit has made a determination of being difficult, the notification unit notifies the power customer of the determination result irrespective of the notification-omitted response setting.

When the power management according to the request is easy, the power management device transmits, to the request source, response information indicating acceptance of the request, without notifying the determination result as to the ease or difficulty in the power management according to the request. Therefore, a wasteful notification of the presence of the request to the power customer can be avoided.

Meanwhile, when the power management according to the request is difficult to be achieved, the power management device notifies the power customer of the difficulty, receives selection of acceptance or rejection of the request, and transmits response information corresponding to the received result, to the request source. Therefore, acceptance of a problematic request against the will of the power customer can be avoided.

(8) Preferably, the power management device includes a selection response setting reception unit configured to receive a selection response setting in which determination by the power customer with respect to the request is required every time. Under operation in the selection response setting, every time the request is received, the notification unit notifies the power customer of the determination result by the determination unit.

When a request based on power supply and demand is received, a determination result as to the ease or difficulty in the power management according to the request is notified of to the power customer, irrespective of the determination result. Therefore, the power customer can recognize the presence of the request based on power supply and demand, and the ease or difficulty of the achievement. Then, the power management device receives a selection of acceptance or rejection of the request from the power customer, and transmits response information corresponding to the received result, to the request source. Therefore, the power customer can confirm the ease or difficulty in the power management according to the request every time, and can manage the power consumption in the building in a reasonable and effective manner.

(9) Preferably, information related to a predetermined request based on power supply and demand, and information according to the history information stored in the storage unit are notified of to the power customer.

Before a setting of a response method to the request is received, information related to a predetermined request and information according to the history information stored in the storage unit are notified of to the power customer. Therefore, the power customer can recognize the outline of the predetermined request to be requested in the future, the state of the power consumption in the past in the building, and the like, and can set a response method on the basis of the recognition.

(10) Preferably, the power management device includes a notification time frame storage unit having stored therein a notification-permitted time frame for which a notification to the power customer is permitted, or a notification-prohibited time frame for which a notification to the power customer is prohibited. The notification unit performs a notification in the notification-permitted time frame stored in the notification time frame storage unit or in a time frame other than the notification-prohibited time frame stored in the notification time frame storage unit.

In the present aspect, only in a notification-permitted time frame, a notification regarding the request is made to the power customer. Therefore, the notification is not made to the customer in a time frame other than the notification-permitted time frame, or in the notification-prohibited time frame.

(11) Preferably, the power management device is provided and operates in the building of the power customer.

In the present aspect, the power consumption in the building can be managed on the building side.

(12) Preferably, the notification unit makes a notification to a communication terminal of the power customer.

The power management device can make a notification regarding the request through the communication terminal of the power customer.

(13) A power management system according to the present aspect includes: the power management device according to aspect (12); a power supply-demand management device configured to transmit the request based on power supply and demand to the power management device; and the communication terminal configured to perform communication with the power management device. The power management device notifies the power customer of the determination result via the communication terminal, receives acceptance or rejection of the request, and transmits the response information corresponding to a received content to the power supply-demand management device.

In the present aspect, when the power management device has received a request based on power supply and demand transmitted from the power supply-demand management device, the power management device determines the ease or difficulty in management of the power consumption according to the request, and notifies the power customer of the determination result through the communication terminal. Then, the power management device receives, through the communication terminal, an instruction on whether or not to accept the request, and transmits response information corresponding to the received content, to the power supply-demand management device.

Therefore, the power customer can comply with the request based on power supply and demand after grasping the degree of difficulty in the power management. Therefore, the power consumption can be managed in a reasonable and effective manner.

(14) A power management method according to the present aspect is for managing power consumption in a building of a power customer. The power management method includes: acquiring power consumption information indicating the power consumption in the building; storing history information including at least the acquired power consumption information, and time information indicating a time frame in which power according to the power consumption information has been consumed in the building, the power consumption information and the time information being associated with each other in the history information; receiving a request based on power supply and demand; determining, when having received the request, ease or difficulty in management of the power consumption according to the request, on the basis of the history information, and power-management-required time frame information indicating a time frame for which power management according to the request is required; notifying the power customer of a determination result; receiving acceptance or rejection of the request; and transmitting response information corresponding to a received content, to a request source.

In the present aspect, similar to aspect (1), as the information for determining whether or not a request regarding demand response should be accepted, information regarding the ease or difficulty in the power management according to the request can be provided to the power customer.

(15) A control program according to the present aspect is for causing a computer configured to manage power consumption in a building of a power customer, to operate and perform the processes of: acquiring power consumption information indicating the power consumption in the building; storing history information including at least the acquired power consumption information, and time information indicating a time frame in which power according to the power consumption information has been consumed in the building, the power consumption information and the time information being associated with each other in the history information; receiving a request based on power supply and demand; determining, when having received the request, ease or difficulty in management of the power consumption according to the request, on the basis of the history information, and power-management-required time frame information indicating a time frame for which power management according to the request is required; notifying the power customer of a determination result; receiving acceptance or rejection of the request; and transmitting response information corresponding to a received content, to a request source.

In the present aspect, similar to aspect (1), as the information for determining whether or not a request regarding demand response should be accepted, information regarding the ease or difficulty in the power management according to the request can be provided to the power customer.

DETAILED DESCRIPTION OF EMBODIMENTS OF THE PRESENT DISCLOSURE

In the following, specific examples of a power management system according to an embodiment of the present disclosure will be described with reference to the drawings. The present disclosure is not limited to these examples and is indicated by the claims, and is intended to include meaning equivalent to the claims and all modifications within the scope of the claims.

<Configuration of Power Management System>

FIG. 1 is a schematic diagram showing a configuration example of a power management system according to the present embodiment. The power management system according to the present embodiment includes: a power management device 1 provided in a building such as a house or an office building of a power customer 10; a power supply-demand management device 2 connected to the power management device 1 via a communication network; a weather information providing device 3, and a communication terminal 4 of the power customer 10. One power management device 1 provided in one building is shown in FIG. 1. However, in actuality, a plurality of power management devices 1 respectively provided in a large number of buildings (not shown) are connected to the power supply-demand management device 2 via the communication network.

The power management system is a distributed-type energy management system in which the balance between power supply and demand is adjusted by causing the power management devices 1 in respective buildings to operate in coordination. The outline of the power management system is as follows.

The power management device 1 is a HEMS or a BEMS that performs energy management of a house or an office building. A watt-hour meter 5, a thermometer-hygrometer 6, power consuming apparatuses 7, a generator 8, and a storage battery 9 are connected to the power management device 1. The power supply-demand management device 2 receives a power consumption reduction request transmitted from a power system monitoring device A of a power supplier when the power supply and demand is tight. Then, the power supply-demand management device 2 transmits a DR (Demand Response) request regarding power saving, to the power management device 1 of each power customer 10. The DR request includes information of: a DR identifier that identifies the DR request; a power-saving-required time frame in which power consumption should be suppressed; a power saving target that indicates power consumption that should be suppressed; a response deadline for the DR request; and the like. The information indicating the power-saving-required time frame corresponds to power-management-required time frame information of the present aspect above. The power saving target may be expressed in terms of an upper limit value of power consumption in a building, a reduction amount or reduction proportion of power consumption, or the like. Each power management device 1 receives a selection of acceptance or rejection of a DR request via the communication terminal 4, and transmits, to the power supply-demand management device 2, response information indicating acceptance or rejection of the DR request. The power management device 1 of the power customer 10 having accepted the DR request performs control of suppressing power consumption in the building such that the power saving target is achieved.

The power supply-demand management device 2 adjusts the balance between power supply and demand of the entirety of the power system by causing the power management devices 1 in the houses and office buildings to operate in coordination in this manner.

Figure 2:
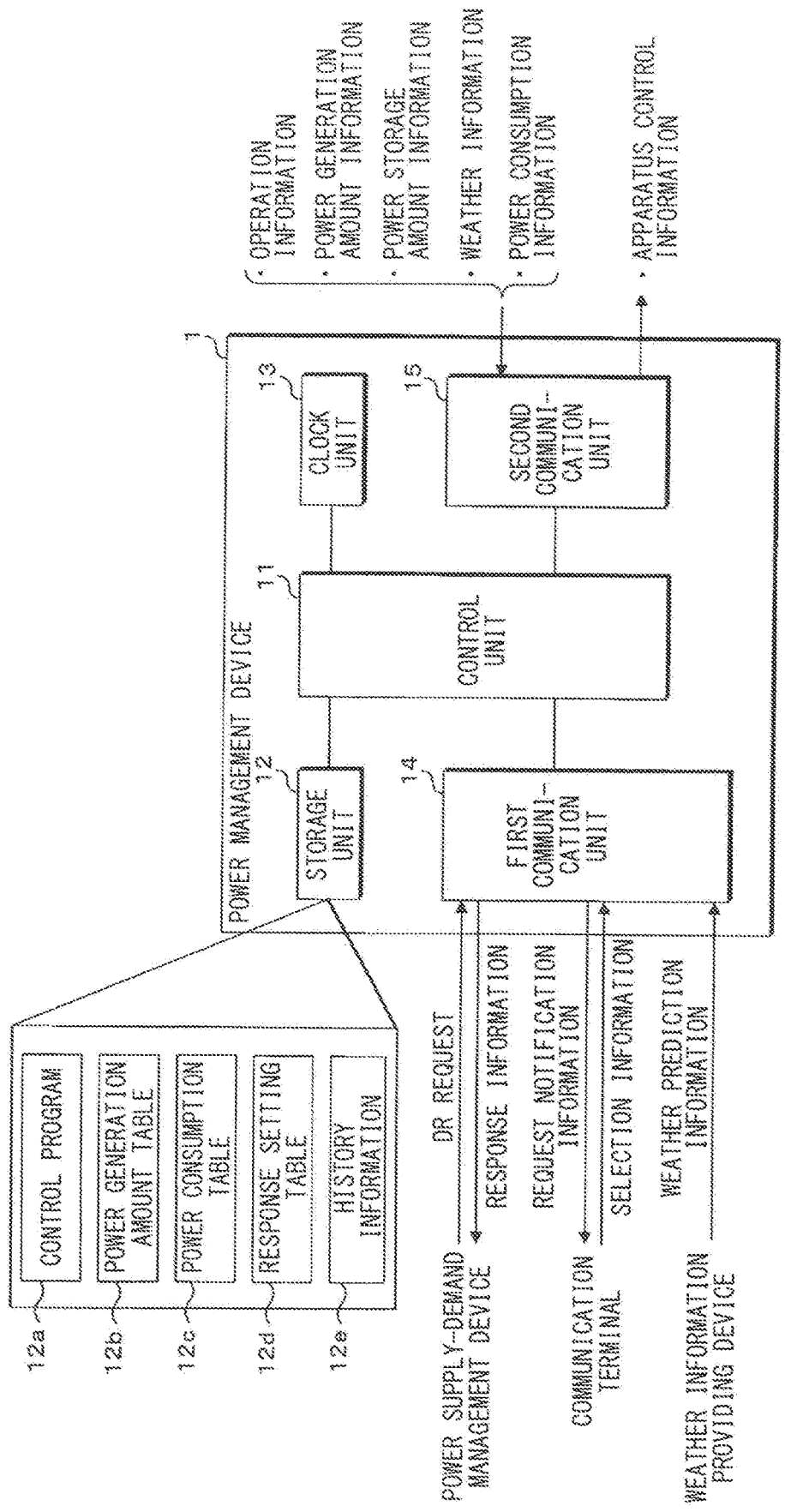
FIG. 2 is a block diagram showing a configuration example of a power management device according to the present embodiment.

FIG. 2 is a block diagram showing a configuration example of the power management device 1 according to the present embodiment. The power management device 1 is a computer including a control unit 11 that controls operations of components. A storage unit 12, a clock unit 13, a first communication unit 14, and a second communication unit 15 are connected to the control unit 11.

For example, the control unit 11 is a microcomputer having a CPU (Central Processing Unit), a ROM (Read Only Memory), a RAM (Random Access Memory), and the like. The control unit 11 operates as the power management device 1 by executing a control program 12a stored in the storage unit 12, and by controlling operations of the respective components. The microcomputer is an example of the control unit 11, and the control unit 11 may be implemented as a DSP (Digital Signal Processor). The control unit 11 may be implemented as a combination of a general purpose microcomputer and a DSP.

The storage unit 12 is a nonvolatile storage device such as an EEPROM (Electrically Erasable Programmable ROM), a flash memory, or a hard disk. The storage unit 12 has stored therein the control program 12a for causing the control unit 11 to execute processes regarding the DR request.

In addition, the storage unit 12 has stored therein a power generation amount table 12b, a power consumption table 12c, and a response setting table 12d. The power generation amount table 12b retains information for predicting a power generation amount of the generator 8 on the basis of the season (month), time frame, weather, etc. As information for specifying an operation control method for each power consuming apparatus 7 for achieving a power saving target, the power consumption table 12c retains the relationship between an operation manner of the power consuming apparatus 7, and apparatus power consumption indicating power consumed by the power consuming apparatus 7 in the operation manner. The response setting table 12d retains a response method to a DR request, in association with each DR identifier. Further, the storage unit 12 has stored therein history information 12e in which the power consumption in the building, the temperature, the humidity, the operation manner of the power consuming apparatus 7, the power generation amount, the power storage amount, and the like are associated with time information. Details of each table and the history information 12e will be described later.

The clock unit 13 measures the current year, month, day, day of the week, and time. The clock unit 13 outputs, to the control unit 11, time information necessary for recording the history information 12e such as power consumption in the building.

The first communication unit 14 is connected to the power supply-demand management device 2, the weather information providing device 3, and the communication terminal 4 via the communication network, whereby the power management device 1 can perform communication with each device.

The power supply-demand management device 2 manages: the power management devices 1 of a plurality of power customers 10 who have a will to cooperate for reduction of power consumption; power consumption that can be reduced; information of the power customers 10; and the like. The power supply-demand management device 2 is connected to the power system monitoring device A of the power supplier. When the power supply-demand management device 2 has received a power consumption reduction request transmitted from the power system monitoring device A, the power supply-demand management device 2 transmits a DR request regarding power saving, to the power management device 1.

The weather information providing device 3 is connected to the power management device 1 via the communication network, and performs communication with the power management device 1. Periodically, or in response to a request from the power management device 1, the weather information providing device 3 transmits, to the power management device 1, information of the current and future air temperature, humidity, weather, and the like in the vicinity of the building.

The communication terminal 4 is a smart phone, a tablet terminal having a wireless communication function, or the like of a power customer 10, and is wirelessly connected to the power management device 1 via the communication network. The communication terminal 4 includes: a communication unit that performs communication with at least the power management device 1; a display unit for outputting information that is communicated; an output device such as a speaker; and an input device such as a touch panel and operation buttons. The communication terminal 4 can perform communication with the power management device 1 via the communication network.

The power management device 1 is configured such that, when having received a DR request, the power management device 1 transmits, as necessary, request notification information related to the DR request, to the communication terminal 4. The communication terminal 4 receives the request notification information and outputs the information related to the DR request.

In addition, the communication terminal 4 receives acceptance or rejection of the DR request, and transmits, to the power management device 1, selection information indicating the received selection content.

Further, the power management device 1 is configured to receive, through the communication terminal 4, a setting of a response method to the DR request.

Although FIG. 1 shows a state in which the communication terminal 4 is outside the building, the location of the communication terminal 4 is not limited in particular, and the communication terminal 4 may be located indoors or outdoors. In addition, a portable wireless communication device such as a smart phone is an example of the communication terminal 4, and it is sufficient that the communication terminal 4 functions as an interface. For example, the communication terminal 4 may be a controller having a monitor screen provided in the building. Further, the power management device 1 may be configured to perform communication with the communication terminal 4 via the power supply-demand management device 2. The power supply-demand management device 2 can perform secure communication by performing authentication of the power management device 1 and the communication terminal 4, and can relay the communication between the power management device 1 and the communication terminal 4.

The second communication unit 15 is connected to the watt-hour meter 5, the thermometer-hygrometer 6, the power consuming apparatuses 7, the generator 8, and the storage battery 9, via a wired or wireless intra-building communication network, and transmits and receives various information in accordance with a predetermined communication protocol. For example, the second communication unit 15 performs wireless communication with each power consuming apparatus 7, the generator 8, and the storage battery 9, through wireless communication in accordance with a Wi-Fi standard. The second communication unit 15 performs wireless communication with the watt-hour meter 5 through wireless communication in accordance with a Wi-SUN standard. As a matter of course, the second communication unit 15 may perform wireless communication with various apparatuses via a wireless LAN router, a gateway, or the like connected to an internal LAN of the power customer.

The watt-hour meter 5 is a sensor that detects power being consumed in the building, and calculates the total amount of power having been consumed from a reference time point to the current time point. The watt-hour meter 5 is a smart meter, for example. The watt-hour meter 5 is connected to the power management device 1 in a wired or wireless manner, and can perform communication with the power management device 1. Periodically or in response to a request from the power management device 1, the watt-hour meter 5 transmits, to the power management device 1, power consumption information indicating the power or the total amount of power being consumed in the building. The power management device 1 can grasp the power or the total amount of power currently being consumed in the building, by receiving the power consumption information transmitted from the watt-hour meter 5.

The thermometer-hygrometer 6 is a sensor that detects the air temperature and the humidity outside the building. The thermometer-hygrometer 6 is connected to the power management device 1 in a wired or wireless manner, and can perform communication with the power management device 1. Periodically or in response to a request from the power management device 1, the thermometer-hygrometer 6 transmits, to the power management device 1, weather information indicating the air temperature and the humidity in the vicinity of the building, i.e., outside the building. The power management device 1 can grasp the current air temperature and humidity outside the building, by receiving the weather information transmitted from the thermometer-hygrometer 6.

Each power consuming apparatus 7 is an apparatus that consumes power supplied from the power supplier, such as an air conditioner 72, a television 73, a lighting apparatus 71, a refrigerator (not shown), or a heat pump water heater (not shown), for example. For example, the power consuming apparatus 7 has a normal operation mode in which power consumption is not suppressed, and a power saving operation mode in which operation is performed with power consumption suppressed. The power consuming apparatus 7 is connected to the power management device 1 in a wired or wireless manner, and can perform communication with the power management device 1. The power management device 1 can transmit apparatus control information that instructs switching between operation modes, turning on and off a power source, or the like to each power consuming apparatus 7, individually. When having received the apparatus control information transmitted from the power management device 1, the power consuming apparatus 7 controls switching between operation modes, turning on and off the power source, or the like in accordance with the apparatus control information.

Each power consuming apparatus 7 can transmit, to the power management device 1, operation information indicating the operation mode, the on/off state, and the like of the power consuming apparatus 7 itself. The power management device 1 can recognize the operation mode, the on/off state, and the like of each power consuming apparatus 7, by receiving the operation information transmitted from the power consuming apparatus 7. In this manner, the power management device 1 recognizes the operation mode of each power consuming apparatus 7 and controls switching between the operation modes, thereby managing the power consumption in the building.

For example, the generator 8 is a photovoltaic power generation apparatus that generates power by use of solar energy, a water heater that generates power by use of combustion waste heat of gas, an emergency power source that generates power with use of a gas turbine engine, or the like. Hereinafter, in the present embodiment, the generator 8 is assumed to be a photovoltaic power generation apparatus. The generator 8 is connected to the power management device 1 in a wired or wireless manner, and can perform communication with the power management device 1. The generator 8 can transmit, to the power management device 1, power generation amount information indicating a power generation amount. The power management device 1 can recognize the amount of power generated by the generator 8 and supplied to the building, by receiving the power generation amount information transmitted from the generator 8.

The storage battery 9 is a lithium ion storage battery, a nickel hydrogen battery, a lead storage battery, or the like that stores surplus power in the building or inexpensive nighttime power. The storage battery 9 may be a storage battery provided in the building or a storage battery installed in an electric automobile. The storage battery 9 is connected to the power management device 1 in a wired or wireless manner, and can perform communication with the power management device 1. The storage battery 9 can transmit, to the power management device 1, power storage amount information indicating a power storage amount. The power management device 1 can recognize the power storage amount in the storage battery 9, by receiving the power storage amount information transmitted from the storage battery 9.

Figure 3:
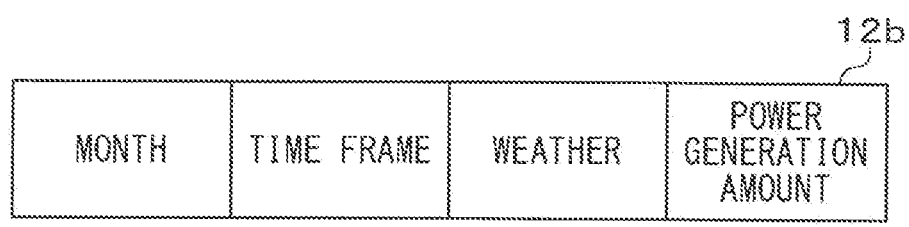
FIG. 3 is a conceptual diagram of a power generation amount table.

FIG. 3 is a conceptual diagram of the power generation amount table 12*b*. For example, the power generation amount table 12*b* retains a month, a time frame, and a weather, and a power generation amount of the generator 8 expected in these conditions, in association with one another.

FIG. 4 is a conceptual diagram of the power consumption table 12*c*. For example, the power consumption table 12*c* retains an apparatus identifier for identifying each power consuming apparatus 7, the name of each apparatus, an operation manner, and apparatus power consumption in the operation manner, in association with one another. For example, the operation manner is information indicating a specific operation state such as whether the operation mode is a normal operation mode or a power saving operation mode, or a set temperature of the air conditioner 72.

<Process of Setting Response Method to DR Request>

Figure 5:
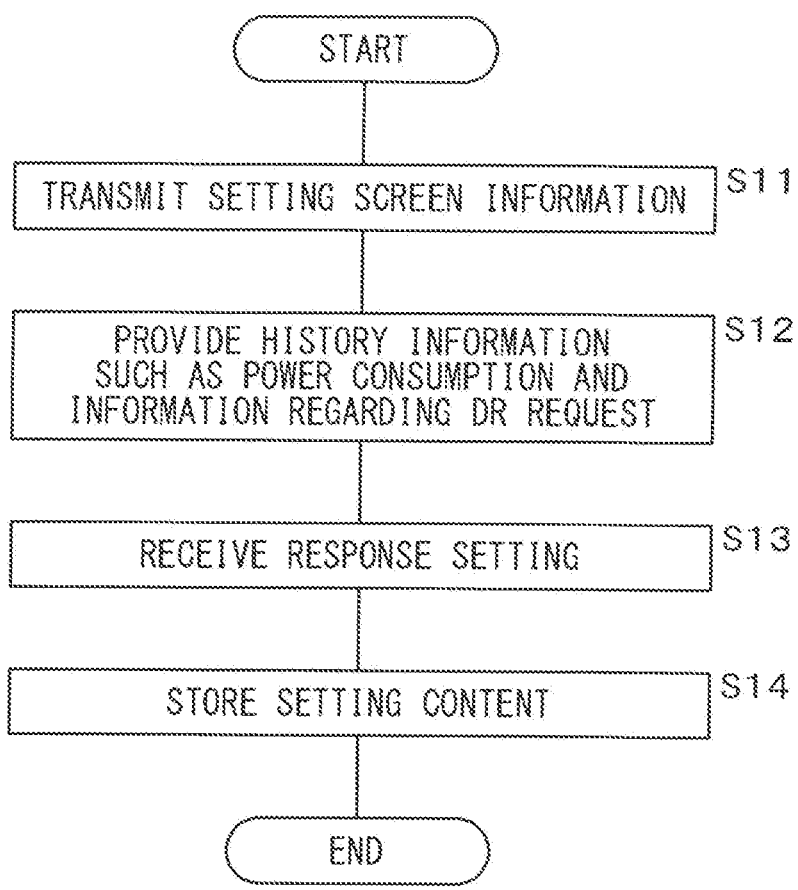
FIG. 5 is a flow chart showing a processing procedure of response setting.

FIG. 5 is a flow chart showing a processing procedure of response setting. When a contract of a DR request service is concluded, the power management device 1 performs the following process for response setting for the DR request. The control unit 11 of the power management device 1 transmits, to the communication terminal 4 via the first communication unit 14, information regarding a setting screen for receiving a response setting for the DR request, and causes the setting screen to be displayed on the display unit of the communication terminal 4 (step S11).

Next, the control unit 11 transmits, to the communication terminal 4 via the first communication unit 14, an outline of the history information 12*e* such as a power consumption amount in the building, and information related to the newly contracted DR request (step S12). The communication terminal 4 having received the information displays information related to a predetermined DR request and the tendency of past power consumption in the building.

Then, the control unit 11 receives a response setting of a response method to be employed when the DR request is made (step S13), stores in the storage unit 12 the received setting content in association with a DR identifier (step S14), and ends the process.

Although an example in which response setting is performed at the time of conclusion of a contract of a DR request service has been described, it is needless to say that the setting of a response method may be received at any timing.

FIG. 6 is a conceptual diagram of a response setting content. The setting content of the response setting is roughly classified into two categories. A first setting "Always accept in principle" is a setting in which, in response to a DR request, response information indicating that the DR request is accepted is automatically transmitted without confirmation by the power customer 10, in principle. A second setting "Always select acceptance or rejection" is a setting in which, with respect to a DR request, confirmation by the power customer 10 is always performed, and in accordance with the selection by the power customer 10, response information indicating that the DR request is accepted or rejected is transmitted. The first setting corresponds to "notification-omitted response setting" in the present aspect above, and the second setting corresponds to "selection response setting" in the present aspect above.

In a situation in which advantages can be obtained at a high frequency by accepting the DR request, the power customer 10 may select "Always accept in principle". In a situation in which disadvantages are caused at a high frequency by rejecting the DR request, the power customer 10 may select "Always accept in principle". In a case where advantages can be obtained if the DR request is accepted, but comfort could be impaired, "Always select" may be selected.

Further, with respect to the first setting "Always accept in principle", it is possible to set the same in a way such that, when the power saving target is difficult to be achieved, a notification is made to the power customer 10 as an exception, and whether or not to confirm acceptance or rejection of the DR request is set.

Further, a notification-permitted time frame in which a notification to the power customer 10 of the presence of a DR request is permitted, or a notification-prohibited time frame can be set. For example, the power customer 10 can set a time frame in which the power customer 10 does not want to receive a notification regarding a DR request, such as midnight.

Further, it is possible to set whether or not to automatically accept a DR request when the response deadline for the DR request has elapsed before the notification-permitted time frame comes.

Through the processes of step S13 and step S14, the setting contents described above are stored in the response setting table 12d.

<Process of Accumulating History Information of Power Consumption, Etc.>

Figure 7:
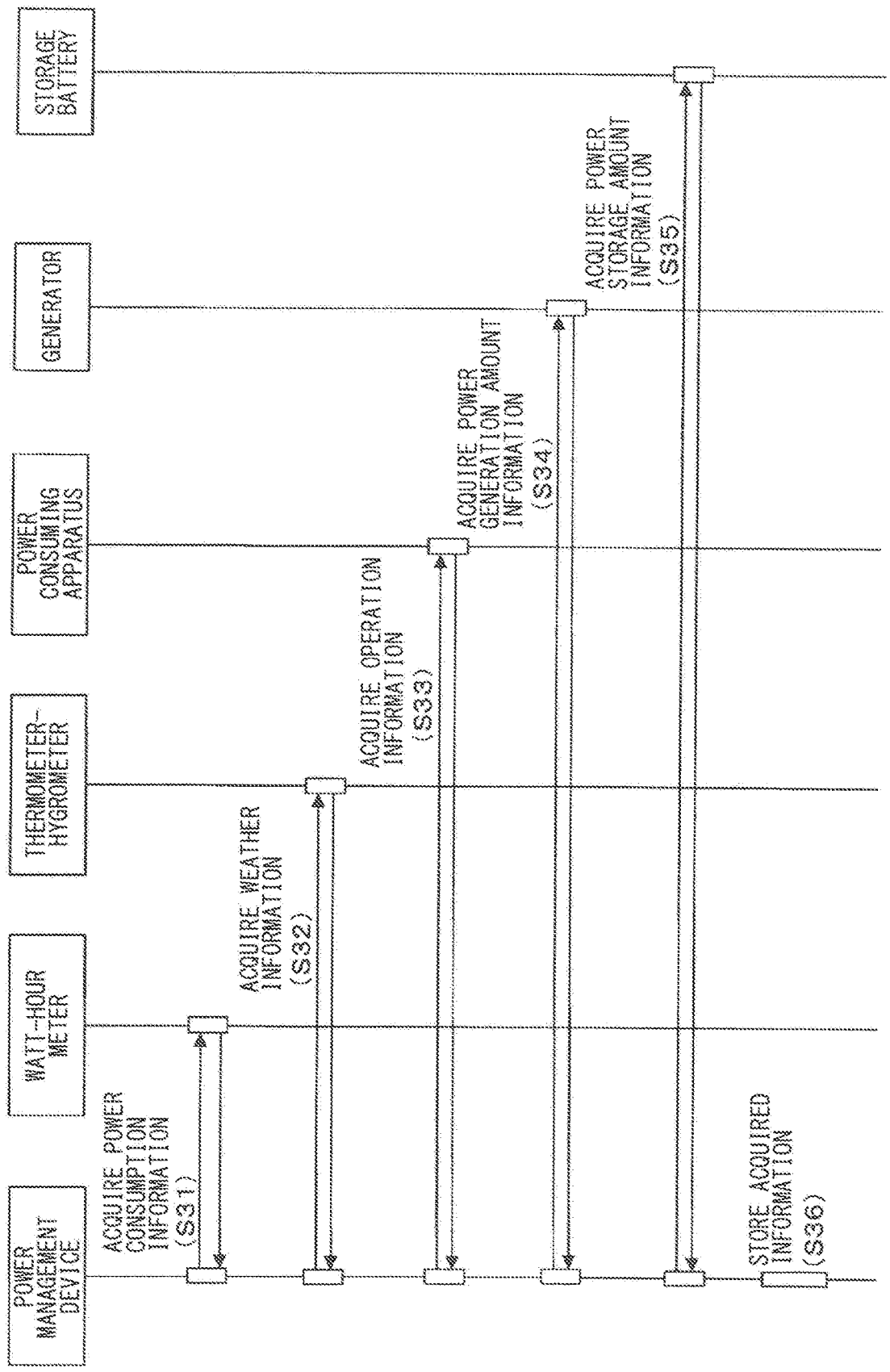

FIG. 7 is a sequence diagram showing a processing procedure regarding accumulation of the history information 12e of power consumption, weather information, and the like. FIG. 8 is a schematic diagram indicating the history information 12e stored in the storage unit 12. The power management device 1 collects information of the power consumption, weather, and power generation amount in the building periodically at predetermined timings, and accumulates the information as the history information 12e. The details are as follows.

The control unit 11 of the power management device 1 performs communication with the watt-hour meter 5, and acquires, from the watt-hour meter 5, power consumption information indicating the power, the total amount of power, or the like consumed in the building (step S31). The control unit 11 performs communication with the thermometer-hygrometer 6, and acquires weather information indicating the air temperature and the humidity outside the building (step S32). Further, the control unit 11 performs communication with each power consuming apparatus 7, and acquires operation information indicating the operation manner of the power consuming apparatus 7 (step S33). Further, the control unit 11 performs communication with the generator 8, and acquires power generation amount information indicating the amount of power generated by the generator 8 (step S34). Still further, the control unit 11 performs communication with the storage battery 9, and acquires power storage amount information indicating the current power storage amount (step S35). Then, as shown in FIG. 8, the control unit 11 associates the power consumption information, the weather information, the operation information, the power generation amount information, and the power storage amount information acquired in step S31 to step S35, with the current year, month, day, and time frame, and stores the resultant information in the storage unit 12, as the history information 12e (step S36).

The processing procedure described above is an example, and the flow of the process and the program structure are not limited to the process of the sequence diagram shown in FIG. 7.

<Processing Procedure of Response to DR Request>

Figure 9:
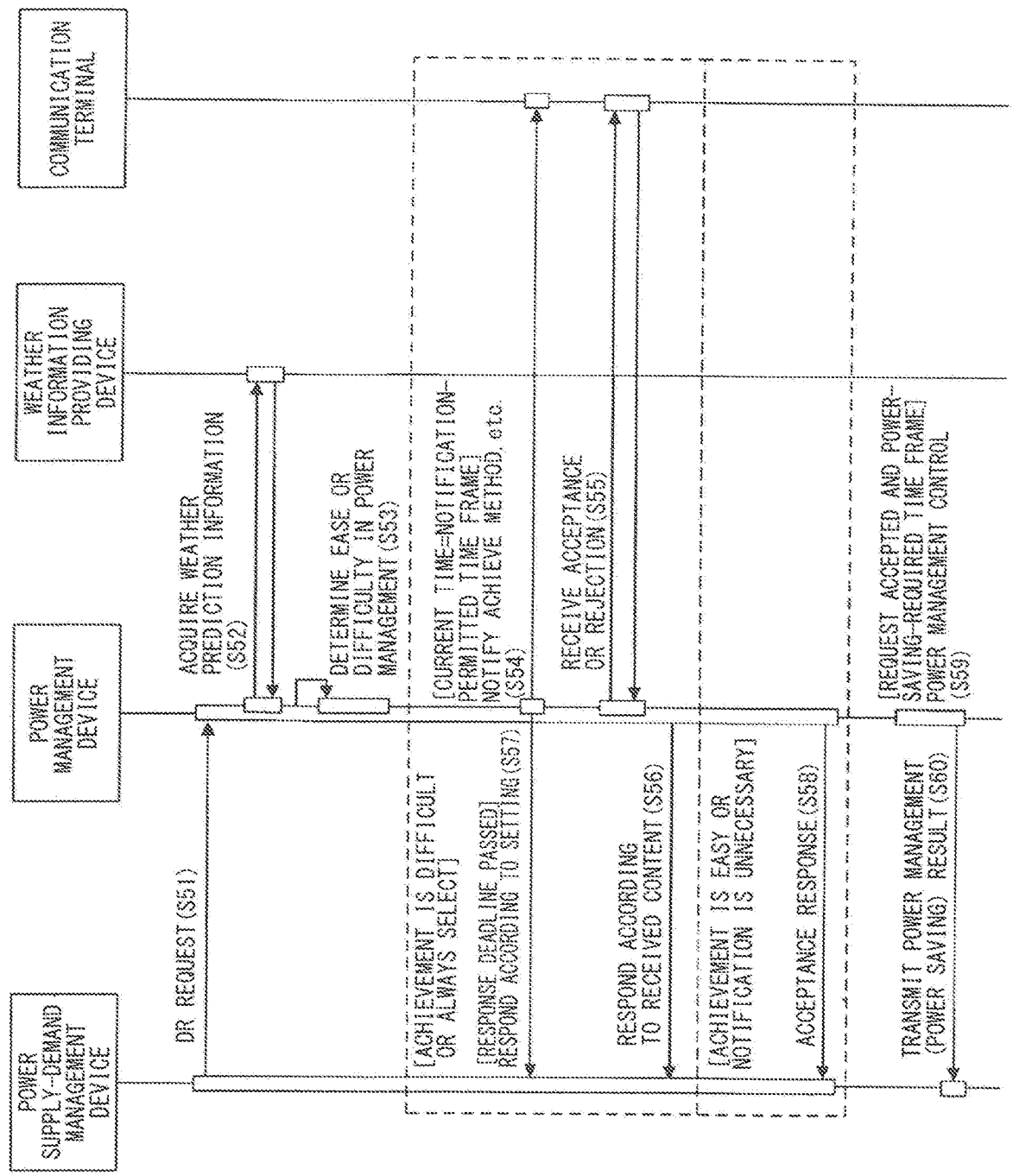
FIG. 9 is a sequence diagram showing a processing procedure of response to a DR request.

FIG. 9 is a sequence diagram showing a processing procedure of response to a DR request. The power supply-demand management device 2 having received a power consumption reduction request transmitted from the power system monitoring device A of the power supplier transmits a DR request to the power management device 1 of each building in order to achieve the reduction request for power consumption (step S51).

When having received the DR request transmitted from the power supply-demand management device 2, the power management device 1 performs communication with the weather information providing device 3, and acquires weather prediction information indicating the air temperature, the humidity, or the like in a power-saving-required time frame (step S52). Next, on the basis of the history information 12e stored in the storage unit 12, the control unit 11 of the power management device 1 determines the ease or difficulty in power management to achieve the power saving target in the power-saving-required time frame indicated by the DR request (step S53).

Figure 10:
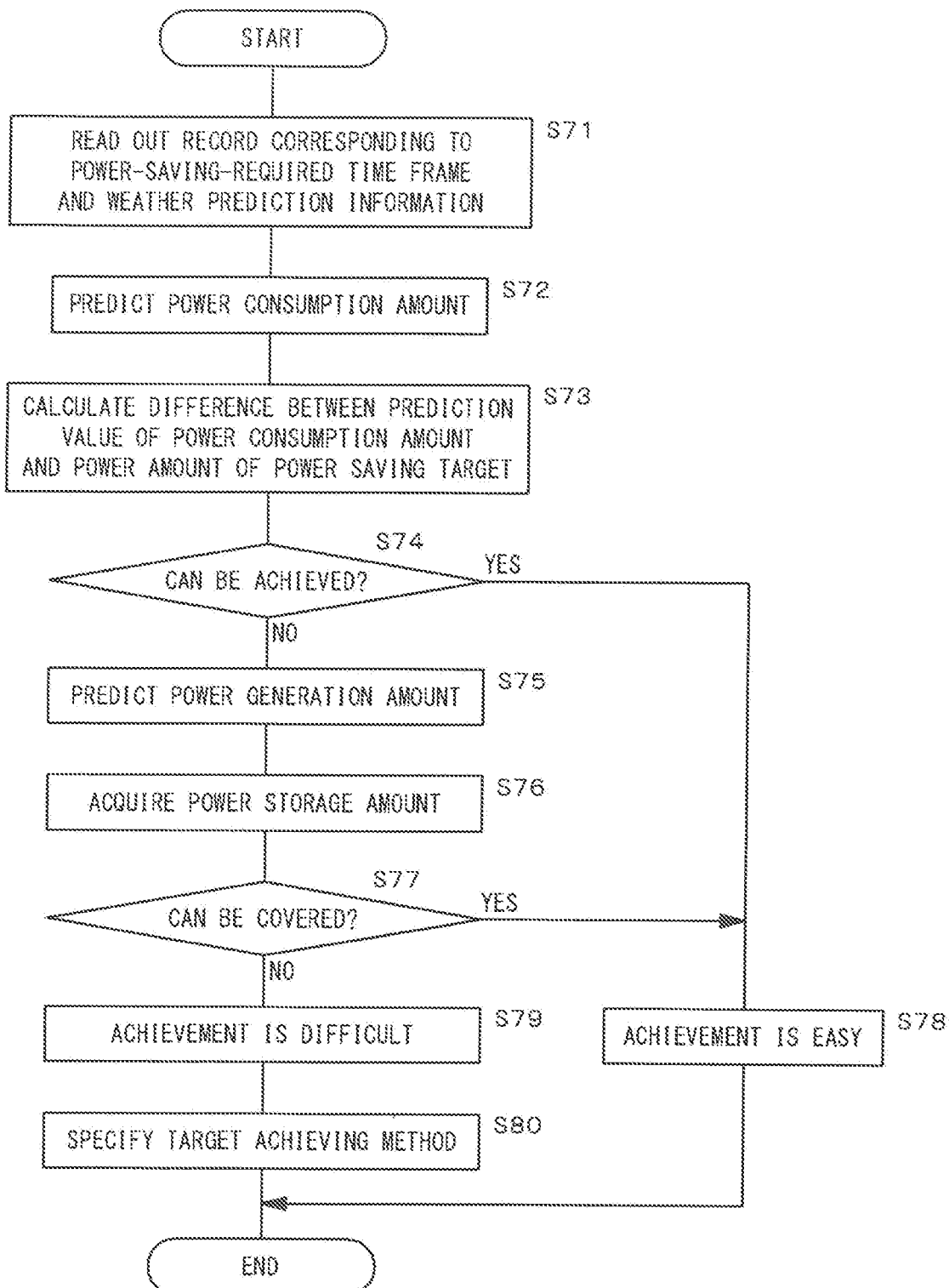
FIG. 10 is a flow chart showing a processing procedure regarding determination of the ease or difficulty in achieving a power saving target.

FIG. 10 is a flow chart showing a processing procedure regarding determination of the ease or difficulty in achieving a power saving target. On the basis of the power-saving-required time frame for which power saving is requested by the DR request and weather prediction information that corresponds to the power-saving-required time frame, the control unit 11 reads out a record similar to the time frame and the weather (step S71). That is, from the storage unit 12, the control unit 11 reads out, from the history information 12e in which the past power consumption amount and the like are recorded, records that have the same time frame as the power-saving-required time frame requested by the DR request and in which the temperature and humidity in the time frame are close to prediction values of the temperature and humidity in the power-saving-required time frame.

Then, on the basis of the read out records, the control unit 11 predicts a power consumption amount in the power-saving-required time frame (step S72). For example, as a power consumption amount in the power-saving-required time frame, the control unit 11 predicts a statistic amount such as an average value, a modal value, or the like of a plurality of records of power consumption amounts having been read out.

Next, the control unit 11 calculates the difference between the prediction value of the power consumption amount and the amount of power of the power saving target of the DR request (step S73), and determines whether or not the power saving target can be achieved (step S74). When having determined that the power saving target can be achieved (step S74: YES), the control unit 11 determines that the power saving target is easy to be achieved (step S78), and ends the determination process.

When having determined that the power saving target cannot be achieved (step S74: NO), the control unit 11 predicts a power generation amount of the generator 8 on the basis of the weather prediction information in the power-saving-required time frame, in particular, on the basis of the weather information (step S75). Specifically, on the basis of the weather prediction information, and the information of the year, month, day, and time frame for which power saving according to the DR request is required, the control unit 11 reads out a corresponding power generation amount from the power generation amount table 12b, thereby predicting a power generation amount of the generator 8.

Next, the control unit 11 performs communication with the storage battery 9, and acquires the current power storage amount of the storage battery 9 (step S76).

Then, the control unit 11 determines whether or not the difference calculated in step S73 can be covered by the power generation amount of the generator 8 and discharge by the storage battery 9 (step S77). When having determined that the difference can be covered (step S77: YES), the control unit 11 determines that the power saving target is easy to be achieved (step S78), and ends the determination process.

When having determined that the difference cannot be covered (step S77: NO), i.e., the power saving target cannot be achieved even in consideration of the power generation amount and the power storage amount, the control unit 11 determines that the power saving target is difficult to be achieved (step S79). Next, with reference to the power consumption table 12c, the control unit 11 specifies a method for achieving the power saving target (step S80).

For example, with reference to the records having been used in predicting the power consumption, the control unit 11 specifies an operation manner of each power consuming apparatus 7. Then, the control unit 11 specifies an operation mode or an operation manner of each power consuming apparatus 7 for enabling suppression of power consumption necessary for achieving the power saving target. For example, in a case where the past set temperature of the air conditioner 72 referred to was 25° C. and a normal operation mode was set, when the power consumption needs to be further suppressed by 0.5 [kW] in order to achieve the power saving target, the control unit 11 specifies switching to "set at 29° C." or "power saving mode" as the operation mode of the air conditioner 72.

Through the above processes, the ease or difficulty in achieving the power saving target and the operation manner of each power consuming apparatus 7 necessary for achieving the power saving target can be specified. As a method for determining the ease or difficulty in achieving the power saving target, an example has been described in which it is determined whether or not the above-described difference can be covered by power generation and discharge. However, the above-described method is merely an example.

With reference back to FIG. 9, a process regarding a response method to a DR request is described. The control unit 11 of the power management device 1 reads out, from the response setting table 12*d*, a response setting that corresponds to the DR identifier included in a DR request, and performs the following process in accordance with the read out response setting.

In a case where "Always accept in principle" has been set as the response method but it has been determined that the power saving target is difficult to be achieved, or in a case where "Always select" has been set, when the current time is in the notification-permitted time frame, the power management device 1 transmits, to the communication terminal 4, information indicating the ease or difficulty in achieving the power saving target of the DR request and information indicating an operation manner and the like of each power consuming apparatus 7 necessary for achieving the power saving target (step S54).

For example, when the power saving target is difficult to be achieved, a message is displayed on the display unit of the communication terminal 4, such as "Acceptance of the DR request is difficult. If the air conditioner is not used from 13:00 to 15:00 in the power-saving-required time frame, the power saving target can be achieved. There is no penalty for rejection of the DR request. Do you accept?" When the power saving target is easy to be achieved, a message is displayed on the display unit of the communication terminal 4, such as "The power saving target of the DR request can probably be achieved. Do you accept?" Through notification of these messages, the power customer 10 can recognize the degree of difficulty in achieving the power saving target, and then select acceptance or rejection of the DR request.

When the current time is not in the notification-permitted time frame or in the notification-prohibited time frame, the power management device 1 waits until the notification-permitted time frame arrives or the notification-prohibited time frame ends, and after the end of the time frame, the power management device 1 transmits information related to the DR request, and information indicating the operation manner, etc., to the communication terminal 4.

Next, the power management device 1 performs communication with the communication terminal 4, and receives selection of acceptance or rejection of the DR request (step S55). Then, in accordance with the received content, the power management device 1 transmits, to the power supply-demand management device 2, response information indicating acceptance or rejection of the DR request (step S56).

Meanwhile, in a case where "Always accept in principle" has been set but it has been determined that the power saving target is difficult to be achieved, or in a case where "Always select" has been set, when the response deadline for the DR request has passed before the notification-permitted time frame arrives, the power management device 1 transmits, to the power supply-demand management device 2, response information indicating acceptance or rejection of the DR request, in accordance with the setting content set as the response setting in advance (step S57).

In a case where "Always accept in principle" has been set and it has been determined that the power saving target is easy to be achieved, or in a case where "Always select" has been set, the power management device 1 transmits, to the power supply-demand management device 2, response information indicating acceptance of the DR request (step S58).

Then, when the DR request is accepted and time measured by the clock unit 13 has come to be in the power-saving-required time frame, the power management device 1 detects the current power consumption in the building by performing communication with the watt-hour meter 5, and controls the operation of each power consuming apparatus 7, etc., thereby managing the power consumption so that the power saving target is achieved (step S59). For example, when the current power consumption is greater than the power consumption of the power saving target, the power management device 1 transmits apparatus control information to each power consuming apparatus 7, to switch each power consuming apparatus 7 into a power saving operation mode. When the power storage amount of the storage battery 9 is not less than a predetermined amount, the power management device 1 transmits, to the storage battery 9, apparatus control information that instructs discharge. When having received the apparatus control information, the storage battery 9 performs discharge, thereby supplying power to each power consuming apparatus 7. In a case where the power consumption is greater than the power consumption of the power saving target even after the operation mode has been switched, the storage battery 9 has discharged, and switching to the power saving operation mode has been performed, the power management device 1 transmits, to a predetermined power consuming apparatus 7, apparatus control information for stopping the operation. When having received the apparatus control information, the power consuming apparatus 7 stops the operation.

When the power-saving-required time frame has elapsed, the power management device 1 transmits a power management result, i.e., a power saving result to the power supply-demand management device 2 (step S60). As the power management result, for example, the information such as the following is transmitted: the DR identifier, whether or not the power saving target of the DR request has been achieved, the power consumption amount in the power-saving-required time frame, the power consumption amount having been reduced, the identifier of the power management device 1, and the like.

According to the power management device 1 configured as above, as the information for determining whether or not a request based on demand response should be accepted, information regarding the ease or difficulty in the power management according to the DR request can be provided to the power customer 10.

In addition, the power management device 1 can determine the ease or difficulty in management of the power consumption according to the DR request, in consideration of the weather information such as the temperature and the humidity.

Further, the power management device 1 can determine the ease or difficulty in management of the power consumption according to the DR request, in consideration of the power generation amount of the generator 8.

Still further, the power management device 1 can determine the ease or difficulty in management in the power consumption according to the DR request, in consideration of the power storage amount of the storage battery 9.

Still further, the power management device 1 can specify an operation manner of each power consuming apparatus 7 necessary for achieving the power saving target of the DR request, with reference to the power consumption table 12c, and can notify the power customer 10 of the operation manner. The power customer 10 can determine whether or not to accept the DR request in consideration of the operation manner. Therefore, the power consumption can be managed in a reasonable and effective manner.

Still further, in a case where "Always accept in principle" has been selected as the response setting, when the power management device 1 has received a DR request and it is easy to achieve the power saving target of the DR request, the power management device automatically transmits response information indicating acceptance of the DR request, to the power supply-demand management device 2. Therefore, a wasteful notification of the presence of the DR request to the power customer 10 can be avoided.

Meanwhile, when the power saving target of the DR request is difficult to be achieved, the power management device 1 notifies the power customer 10 of the difficulty, receives selection of acceptance or rejection of the DR request, and transmits response information corresponding to the received result, to the power supply-demand management device 2. Therefore, automatic acceptance of a problematic DR request can be avoided.

Still further, in a case where "Always select" has been selected as the response setting, when a DR request has been made, a message indicating the presence of the DR request is notified of to the power customer 10, together with the degree of difficulty in achieving the power saving target of the DR request. Therefore, the power customer 10 can confirm the presence of the DR request and the ease or difficulty in achieving the power saving target every time, and can manage the power consumption in the building in a reasonable and effective manner.

Still further, before a setting for a response method to a DR request is received, information related to the contracted DR request, and information according to the history information 12e are notified of to the power customer 10. Therefore, the power customer 10 can recognize the outline of the DR request to be requested in the future, the state of the power consumption in the past in the building, and the like, and can set a response method on the basis of the recognition.

Still further, only in a time frame other than the notification-prohibited time frame, or only in the notification-permitted time frame, a notification regarding the DR request is made to the power customer 10. Therefore, it is possible to avoid making a notification regarding the DR request in a time frame in which the power customer 10 does not wish to receive the notification.

Still further, since the power management device 1 is provided in the building of the power customer 10, the power consumption in the building can be managed on the building side.

Still further, the power management device 1 can make a notification regarding the DR request through the communication terminal 4 of the power customer 10. The power customer 10 can receive the notification of the DR request through the communication terminal 4 and select acceptance or rejection of the DR request.

Modification 1

An example has been described in which the power generation amount of the generator 8 is predicted with use of the power generation amount table 12b. However, the power generation amount may be predicted on the basis of the history information 12e. That is, the control unit 11 stores the weather in addition to the air temperature and the humidity as the history information 12e. Then, in step S74, from the history information 12e, the control unit 11 may read out a record that includes weather information similar to the weather prediction information in the power-saving-required time frame, in particular, a similar weather, and on the basis of the record, the control unit 11 may predict a power generation amount of the generator 8.

According to Modification 1, when the history information 12e has been sufficiently accumulated, the power generation amount of the generator 8 can be more accurately predicted, and the degree of difficulty in achieving the power saving target of the DR request can be determined.

Modification 2

In the above embodiment, a method for specifying, on the basis of information of the power consumption table 12c, an operation manner necessary for achieving the power saving target has been described. However, the operation manner may be specified on the basis of the history information 12e. For example, only records that have the same power-saving-required time frame and the same weather information, and that have power saving targets having been achieved, are extracted, and the operation manners of the respective power consuming apparatuses 7 stored in the records are extracted, whereby operation manners of the respective power consuming apparatuses 7 for enabling achievement of the power saving target may be specified.

The watt-hour meter 5 may detect the power consumption of each power consuming apparatus 7, and may store, in the storage unit 12, the power consumption and the operation manner of each power consuming apparatus 7, as the history information 12e. In this case, the power management device 1 can specify the relationship between the operation manner and the power consumption of each power consuming apparatus 7 on the basis of the history information 12e. By using the specified relationship between the operation manner and the power consumption, the power management device 1 can specify an operation manner necessary for achieving the power saving target.

According to Modification 2, on the basis of the history information 12e, the power management device 1 can specify an operation manner of each power consuming apparatus 7 necessary for achieving the power saving target of the DR request, and can notify the power customer 10 of the operation manner. The power customer 10 can determine whether or not to accept the DR request, in consideration of the operation manner. Therefore, the power consumption can be managed in a reasonable and effective manner.

Modification 3

In the above embodiment, a mode in which the control program 12a is stored in the storage unit 12 has been described. However, a mode may be employed in which the control program 12a according to the present embodiment is recorded in a computer readable storage medium (not shown). The control program 12a read out from the storage medium by a reading device (not shown) is stored in the storage unit 12. The storage medium is an optical disk such as a CD (Compact Disc)-ROM, a DVD (Digital Versatile Disc)-ROM, or a BD (Blu-ray (registered trade mark) Disc), a magnetic disk such as a flexible disk or a hard disk, a magnetic optical disk, a semiconductor memory, or the like. Alternatively, the control program 12a according to the present embodiment may be downloaded from an external computer (not shown) connected to a communication network (not shown), and may be stored in the storage unit 12.

REFERENCE SIGNS LIST 1 power management device
2 power supply-demand management device
3 weather information providing device
4 communication terminal
5 watt-hour meter
6 thermometer-hygrometer
7 power consuming apparatus
8 generator
9 storage battery
10 power customer
11 control unit

The invention claimed is:

1. A power management device configured to manage power consumption in a building of a power customer, the power management device comprising:
 a power-consumption-information acquisition unit configured to acquire power consumption information indicating the power consumption in the building;
 a storage unit having stored therein history information including at least the power consumption information acquired by the power-consumption-information acquisition unit, and time information indicating a time frame in which power according to the power consumption information has been consumed in the building, the power consumption information and the time information being associated with each other in the history information;
 a request reception unit configured to receive a request based on power supply and demand;
 a determination unit configured to, when the request reception unit has received the request, determine ease or difficulty in management of the power consumption according to the request, on the basis of the history information stored in the storage unit, and power-management-required time frame information indicating a time frame for which power management according to the request is required;
 a notification unit configured to notify the power customer of a determination result by the determination unit;
 a reception unit configured to receive acceptance or rejection of the request; and
 a response transmission unit configured to transmit, to a request source, response information corresponding to a content received by the reception unit.

2. The power management device according to claim 1, further comprising:
 a weather information acquisition unit configured to acquire weather information indicating a weather in a vicinity of the building; and
 a prediction information acquisition unit configured to acquire weather prediction information indicating a predicted weather in the vicinity of the building, wherein
 the history information further includes the weather information acquired by the weather information acquisition unit, and at least the power consumption information, the time information, and the weather information are associated with one another in the history information, and
 the determination unit determines the ease or difficulty in the management of the power consumption according to the request, on the basis of the history information stored in the storage unit, the weather prediction information acquired by the prediction information acquisition unit, and the power-management-required time frame information indicating the time frame for which the power management according to the request is required.

3. The power management device according to claim 2, wherein
 the weather prediction information includes information indicating the predicted weather in the vicinity of the building,
 the power management device further includes a power generation amount prediction unit configured to predict a power generation amount of a generator configured to generate power by use of energy of sunlight, on the basis of the weather prediction information acquired by the prediction information acquisition unit, and
 the determination unit determines the ease or difficulty in the management of the power consumption according to the request, on the basis of the history information stored in the storage unit, the weather prediction information acquired by the prediction information acquisition unit, the power-management-required time frame information indicating the time frame for which the power management according to the request is required, and a prediction result of the power generation amount prediction unit.

4. The power management device according to claim 3, further comprising
 a power storage amount information acquisition unit configured to acquire power storage amount information indicating a power storage amount of a storage battery provided in the building, wherein
 the determination unit determines the ease or difficulty in the management of the power consumption according to the request, on the basis of the history information stored in the storage unit, the power-management-required time frame information indicating the time frame for which the power management according to the request is required, and the power storage amount information acquired by the power storage amount information acquisition unit.

5. The power management device according to claim 3, wherein
 the storage unit has stored therein a relationship between an operation manner of a power consuming apparatus provided in the building and an apparatus power consumption indicating power consumed by the power consuming apparatus in the operation manner, and the power management device further includes:
- a specifying unit configured to specify the operation manner of the power consuming apparatus for enabling the management of the power consumption according to the request, on the basis of the history information stored in the storage unit, and the relationship between the operation manner and the apparatus power consumption; and
- an operation manner notification unit configured to notify the power customer of the operation manner specified by the specifying unit.

6. The power management device according to claim 2, wherein the storage unit has stored therein a relationship between an operation manner of a power consuming apparatus provided in the building and an apparatus power consumption indicating power consumed by the power consuming apparatus in the operation manner, and the power management device further includes:
- a specifying unit configured to specify the operation manner of the power consuming apparatus for enabling the management of the power consumption according to the request, on the basis of the history information stored in the storage unit, and the relationship between the operation manner and the apparatus power consumption; and
- an operation manner notification unit configured to notify the power customer of the operation manner specified by the specifying unit.

7. The power management device according to claim 1, further comprising
- a power storage amount information acquisition unit configured to acquire power storage amount information indicating a power storage amount of a storage battery provided in the building, wherein the determination unit determines the ease or difficulty in the management of the power consumption according to the request, on the basis of the history information stored in the storage unit, the power-management-required time frame information indicating the time frame for which the power management according to the request is required, and the power storage amount information acquired by the power storage amount information acquisition unit.

8. The power management device according to claim 1, wherein the storage unit has stored therein a relationship between an operation manner of a power consuming apparatus provided in the building and an apparatus power consumption indicating power consumed by the power consuming apparatus in the operation manner, and the power management device further includes:
- a specifying unit configured to specify the operation manner of the power consuming apparatus for enabling the management of the power consumption according to the request, on the basis of the history information stored in the storage unit, and the relationship between the operation manner and the apparatus power consumption; and
- an operation manner notification unit configured to notify the power customer of the operation manner specified by the specifying unit.

9. The power management device according to claim 1, further comprising
- an operation information acquisition unit configured to acquire operation information indicating an operation manner of a power consuming apparatus provided in the building, wherein the history information further includes the operation information acquired by the operation information acquisition unit, and at least the power consumption information, the time information, and the operation information are associated with one another in the history information, and the power management device further includes:
- a specifying unit configured to specify the operation manner of the power consuming apparatus for enabling the management of the power consumption according to the request, on the basis of the history information stored in the storage unit; and
- an operation manner notification unit configured to notify the power customer of the operation manner specified by the specifying unit.

10. The power management device according to claim 1, further comprising
- a notification-omitted response setting reception unit configured to receive a notification-omitted response setting in which, when the request reception unit has received the request, if the determination unit has made a determination of being easy, the notification of the determination result by the notification unit is omitted, and the response information indicating that, with respect to the request, the request is to be accepted is transmitted to the request source, wherein under operation in the notification-omitted response setting, when the determination unit has made a determination of being easy, the response transmission unit transmits the response information indicating that the request is to be accepted, and when the determination unit has made a determination of being difficult, the notification unit notifies the power customer of the determination result irrespective of the notification-omitted response setting.

11. The power management device according to claim 10, wherein information related to a predetermined request based on power supply and demand, and information according to the history information stored in the storage unit are notified of to the power customer.

12. The power management device according to claim 1, further comprising
- a selection response setting reception unit configured to receive a selection response setting in which determination by the power customer with respect to the request is required every time, wherein under operation in the selection response setting, every time the request is received, the notification unit notifies the power customer of the determination result by the determination unit.

13. The power management device according to claim 12, wherein information related to a predetermined request based on power supply and demand, and information according to the history information stored in the storage unit are notified of to the power customer.

14. The power management device according to claim 1, further comprising
- a notification time frame storage unit having stored therein a notification-permitted time frame for which a notification to the power customer is permitted, or a notification-prohibited time frame for which a notification to the power customer is prohibited, wherein the notification unit performs a notification in the notification-permitted time frame stored in the notification time frame storage unit or in a time frame other than the notification-prohibited time frame stored in the notification time frame storage unit.

15. The power management device according to claim 1, wherein the power management device is provided and operates in the building of the power customer.

16. The power management device according to claim 1, wherein the notification unit makes a notification to a communication terminal of the power customer.

17. A power management system comprising:

the power management device according to claim 16;

a power supply-demand management device configured to transmit the request based on power supply and demand to the power management device; and the communication terminal configured to perform communication with the power management device, wherein the power management device notifies the power customer of the determination result via the communication terminal, receives acceptance or rejection of the request, and transmits the response information corresponding to a received content to the power supply-demand management device.

18. The power management device according to claim 2, further comprising a power storage amount information acquisition unit configured to acquire power storage amount information indicating a power storage amount of a storage battery provided in the building, wherein the determination unit determines the ease or difficulty in the management of the power consumption according to the request, on the basis of the history information stored in the storage unit, the power-management-required time frame information indicating the time frame for which the power management according to the request is required, and the power storage amount information acquired by the power storage amount information acquisition unit.

19. A power management method for managing power consumption in a building of a power customer, the power management method comprising:

acquiring power consumption information indicating the power consumption in the building;

storing history information including at least the acquired power consumption information, and time information indicating a time frame in which power according to the power consumption information has been consumed in the building, the power consumption information and the time information being associated with each other in the history information;

receiving a request based on power supply and demand;

determining, when having received the request, ease or difficulty in management of the power consumption according to the request, on the basis of the history information, and power-management-required time frame information indicating a time frame for which power management according to the request is required;

notifying the power customer of a determination result;

receiving acceptance or rejection of the request; and transmitting response information corresponding to a received content, to a request source.

20. A non-transitory computer readable medium comprising a control program for causing a computer configured to manage power consumption in a building of a power customer, to operate and perform the processes of:

acquiring power consumption information indicating the power consumption in the building;

storing history information including at least the acquired power consumption information, and time information indicating a time frame in which power according to the power consumption information has been consumed in the building, the power consumption information and the time information being associated with each other in the history information;

receiving a request based on power supply and demand;

determining, when having received the request, ease or difficulty in management of the power consumption according to the request, on the basis of the history information, and power-management-required time frame information indicating a time frame for which power management according to the request is required;

notifying the power customer of a determination result;

receiving acceptance or rejection of the request; and transmitting response information corresponding to a received content, to a request source.

* * * * *